United States Patent [19]

Takeuchi et al.

[11] Patent Number: 4,505,726
[45] Date of Patent: Mar. 19, 1985

[54] EXHAUST GAS CLEANING DEVICE

[75] Inventors: Yukihisa Takeuchi, Chita; Masahiro Tomita, Anjo, both of Japan

[73] Assignees: Nippondenso Co., Ltd., Kariya; Nippon Soken, Inc., Nishio, both of Japan

[21] Appl. No.: 495,404

[22] Filed: May 17, 1983

[30] Foreign Application Priority Data

May 18, 1982 [JP] Japan ................................. 57-83723

[51] Int. Cl.³ .......................... B01D 46/48; F01N 3/02
[52] U.S. Cl. ....................................... 55/282; 55/466; 55/DIG. 10; 55/DIG. 30; 55/283; 60/295; 60/311; 422/174
[58] Field of Search ................. 55/208, 282, 283, 466, 55/523, DIG. 10, DIG. 30; 60/295, 299, 300, 303, 311; 422/174, 178, 199; 338/262

[56] References Cited

U.S. PATENT DOCUMENTS

| 4,105,530 | 8/1978 | Johnson et al. | 338/262 |
| 4,276,066 | 6/1981 | Bly et al. | 55/287 |
| 4,373,330 | 2/1983 | Stark | 60/295 |
| 4,427,418 | 1/1984 | Kogiso et al. | 60/300 |

FOREIGN PATENT DOCUMENTS

| 55-131518 | 10/1980 | Japan | |
| 203813 | 12/1982 | Japan | 60/311 |
| 203812 | 12/1982 | Japan | 60/311 |
| 195814 | 12/1982 | Japan | 60/311 |

*Primary Examiner*—David L. Lacey
*Attorney, Agent, or Firm*—Cushman, Darby & Cushman

[57] ABSTRACT

An exhaust gas cleaning device provided with a filter member for collecting carbon particulates in exhaust gases discharged from a diesel engine and an electric heater for burning off the particulates collected by the filter member, is disclosed. The filter member is composed of a large number of intersecting porous walls which define a large number of inlet gas passages and outlet gas passages which are adjacent to each other. The electric heater is composed of at least one film-shaped heating resistor which is directly formed on the upstream end surface of the filter member so as to be integral therewith. When the amount of carbon particulates collected by the filter member reaches a predetermined level, electric current is supplied to the electric heater. The carbon particulates adhered to the upstream end surface of the filter member are ignited and burnt off. Then, the combustion of carbon particulates spreads to the other carbon particulates collected in the other portion of the filter member.

8 Claims, 9 Drawing Figures

EXHAUST GAS CLEANING DEVICE

BACKGROUND OF THE INVENTION

The present invention relates to an exhaust gas cleaning device for cleaning exhaust gases discharged from an internal combustion engine of an automobile or the like, particularly to an exhaust gas cleaning device provided with a filter member for collecting carbon particulates in exhaust gases discharged from a diesel engine and an electrically heating means for burning off the particulates collected by the filter member.

As the filter member to be employed in the exhaust gas cleaning device of this type, a honeycomb structured ceramic fiber member having a large number of gas inlet passages and a large number of gas outlet passages which are defined by a large number of intersecting porous walls so as to be adjacent to each other, has been proposed.

In this filter member, exhaust gases discharged from an internal combustion engine flow into the gas inlet passages, pass the porous walls and are discharged from the adjacent gas outlet passages. During the above process, carbon particulates are adhered to the surface of the porous walls defining the gas inlet passages.

As the carbon particulates are accumulated on the surface of the above porous walls, the flowing resistance of the filter member gradually increases. At last, the porous walls are clogged with the accumulated carbon particulates to reduce the output of the engine.

Therefore, it is required to regenerate the filter member by periodically eliminating carbon particulates accumulated on the surface of the porous walls.

As the filter member regenerating means, a heater wire made of nichrome wire or the like, which is provided within exhaust gas passages of the filter member or near the upstream end surface of the filter member for burning off collected particulates, has been proposed.

However, the heater wire is apt to be short-circuited with another heater wire or peeled from the filter member due to vibrations or the like of the automobile. Therefore, great care must be taken when the heater wire is mounted on the filter member.

Accordingly, an object of the present invention is to provide an exhaust gas cleaning device provided with an electric heater which can be integrally mounted on a filter member by a simple mounting structure without being peeled therefrom.

SUMMARY OF THE INVENTION

The exhaust gas cleaning device of the present invention comprises a honeycomb structured ceramic filter member, and an electric heater for heating and burning off carbon particulates in exhaust gases, which are collected by the filter member.

The filter member is composed of a large number of intersecting porous walls which define a large number of inlet gas passages and outlet gas passages which are adjacent to each other.

The downstream end of each of the inlet gas passages is closed by a downstream end wall while the upstream end of each of the outlet gas passages is closed by an upstream end wall.

Therefore, exhaust gases discharged from an engine, flow into the inlet gas passages, pass the porous walls and are discharged from the outlet gas passages.

The electric heater is composed of at least one film-shaped heating resistor which is directly formed on the upstream end wall so as to be integral therewith.

When the amount of carbon particulates collected by the filter member reaches a predetermined level, electric current is supplied to the electric heater. The carbon particulates adhered to the upstream end surface of the filter member are ignited and burnt off. Then, the combustion of carbon particulates spreads to the other carbon particulates collected by the other portion of the filter member. As a result, all of the carbon particulates collected by the filter member are burnt off.

DETAILED DESCRIPTION OF THE EMBODIMENTS

Hereinafter, the present invention will be explained in accordance with the several embodiments with reference to the drawings.

Figure 1:
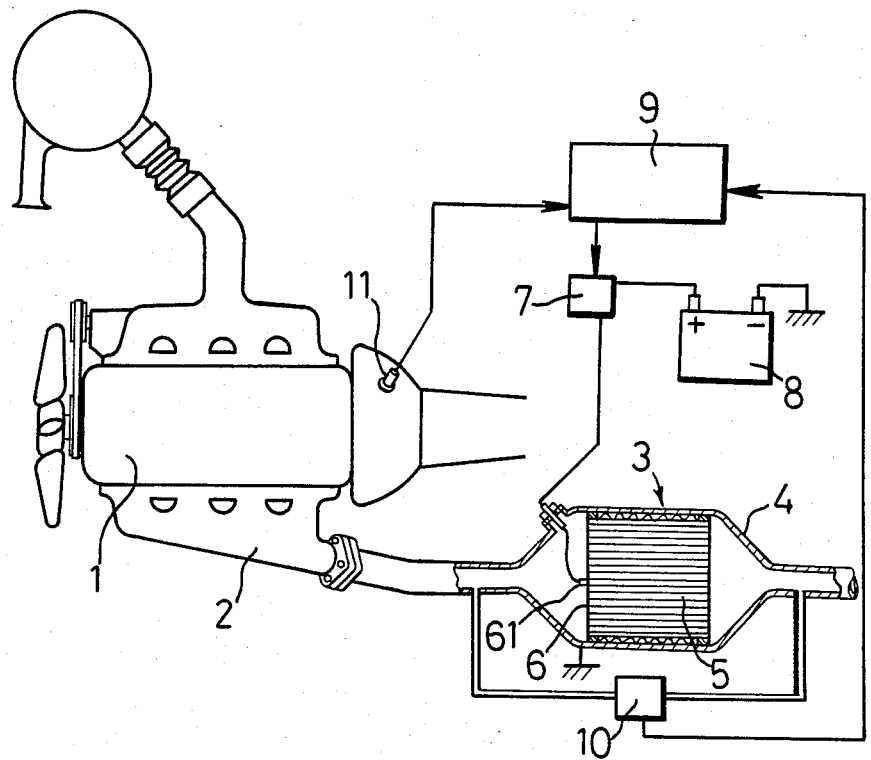
FIG. 1 is a view illustrating an exhaust system of an engine provided with an exhaust gas cleaning device according to the present invention.

In FIG. 1, the reference numeral 1 designates an internal combustion engine, 2 designates an exhaust pipe and 3 designates an exhaust gas cleaning device provided with an electric heater. The exhaust gas cleaning device 3 is disposed in the exhaust pipe 2. The device 3 is provided with a casing 4, a filter member 5 accomodated within the casing 4 and an elctric heater 6 provided on the upstream end surface of the filter member 5.

The filter member 5 is formed of heat resistant ceramic such as cordierite or alumina into a honeycomb structure provided with a large number of open passages.

A differential pressure sensor 10 is mounted on the casing 4 for detecting the differential pressure between the upstream end and the downstream end of the filter member 5. The sensor 10 is electrically connected to a relay 7 by way of a control device 9.

The electric heater 6 is electrically connected to a battery 8 by way of a positive electrode terminal 61 and the relay 7.

In operation, while exhaust gases containing carbon particulates pass the filter member 5, the carbon particulates are collected by the filter member 5. As the collection of carbon particulates proceeds, the flowing resistance of the filter member 5 gradually increases so that the differential pressure betweeen the upstream end and the downstream end of the filter member 5, increases.

When the differential pressure reaches a predetermined level, the differential pressure sensor 10 supplies electric signal to the control circuit 9. Then, the control circuit 9 supplies electric signal to the relay 7.

As a result, electric current is supplied to the electric heater 6 from the battery 8 through the relay 7 so that the electric heater 6 generates heat.

The carbon particulates collected in and near the upstream end surface of the filter member 5 are heated to be burnt off. The combustion heat of the carbon particulates is transmitted to the carbon particulates collected in the downstream portion of the filter member 5.

As a result, all of the carbon particulates collected by the filter member 5 are burnt off.

The above described differential pressure varies in accordance with the engine speed. By connecting an engine speed sensor 11 to the control device 9 so as to eliminate the influence of engine speed from the electric signal to be supplied to the relay 7, the electric heater 6 can be accurately operated in accordance with only the accumulating degree of carbon particulates.

Figure 2:
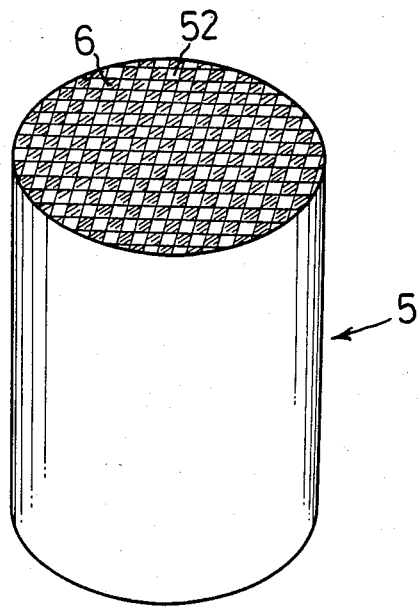
FIG. 2 is a perspective view of a filter member employed in an exhaust gas cleaning device according to the present invention.

As shown in FIG. 2, the filter member 5 is formed of ceramic such as cordierite into a honeycomb structure.

Figure 3:
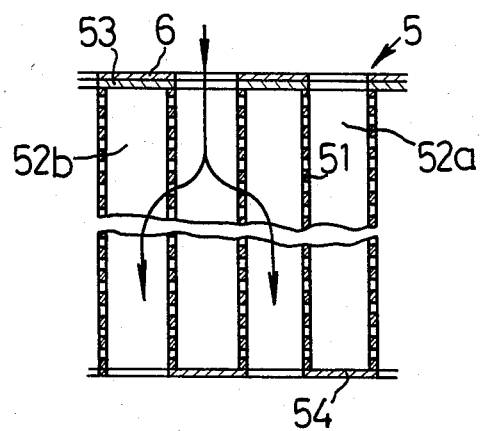
FIG. 3 is a partially cut away longitudinal sectional view of one portion of the filter member employed in a first embodiment of the exhaust gas cleaning device according to the present invention.

As shown in FIGS. 2 and 3, the filter member 5 is provided with a large number of parallel gas inlet passages 52a and a large number of parallel gas outlet passages 52b which are defined by a large number of intersecting grid-shaped porous walls 51. Each of the gas inlet passages 52a is adjacent to each of the gas outlet passages 52b.

Each of the gas inlet passages 52a is closed in the downstream end thereof by an end wall 54 while each of the gas outlet passages 52b is closed in the upstream end thereof by an end wall 53.

As shown by arrows in FIG. 3, the exhaust gases containing carbon particulates flow into the gas inlet passages 52a, pass the porous walls 51 and flow into the gas outlet passages 52b. The carbon particulates are collected and accumulated on the surfaces of the porous walls 51 due to impact or diffusion thereof, and thereafter burnt off by the heater 6.

On the upstream end surface of the filter member 5 a film-shaped heater 6 composed of a heating resistor, is formed. As the heating resistor, metal such as platinum, platinum-rhodium alloy, molybdenum, molybdenum-manganese alloy, tungsten, gold or silver-paradium alloy or ceramic such as titanium nitride, silicon carbide, or molybdenum silicide, is employed. The film-shaped heater 6 is formed by applying or printing a paste made of a mixture of the above metal or ceramic with an organic binder, to the surface of the filter member 5 and firing the above paste so as to be integrally adhered to the filter member 5.

The heater 6 can be also formed by evaporating the above paste to the surface of the filter member 5.

In operation, when the amount of carbon particulates collected by the filter member 5 reaches a predetermined level, electric current is supplied to the heater 6. The carbon particulates collected on or near the upstream end surface of the filter member 5 are heated by the heater 6 and starts burning. The combustion heat of the carbon particulates is transmitted to the downstream side of the filter member along the surface of the porous walls 51 with the exhaust gas flowing to the downstream end of the filter member 5. The carbon particulates accumulated on the porous walls 51 are successively burnt off from the upstream end to the downstream end of the filter member 5. As a result, the filter member 5 is entirely regenerated.

Figure 4:
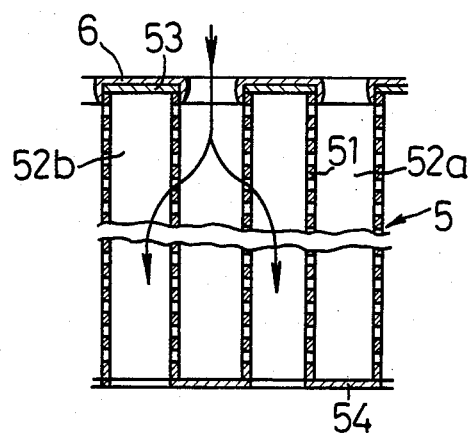
FIG. 4 is a partially cut away longitudinal sectional view of one portion of the filter member employed in a second embodiment of the exhaust gas cleaning device according to the present invention.

FIG. 4 illustrates a filter member employed in a second embodiment of the exhaust gas cleaning device according to the present invention.

The heater 6 is also formed on the upstream end portion of the porous walls 51 defining each of the gas inlet passages.

According to this embodiment, ignitability of carbon particulates can be improved and the combustion of carbon particulates can be easily transmitted to the downstream side of the filter member 5.

Figure 5:
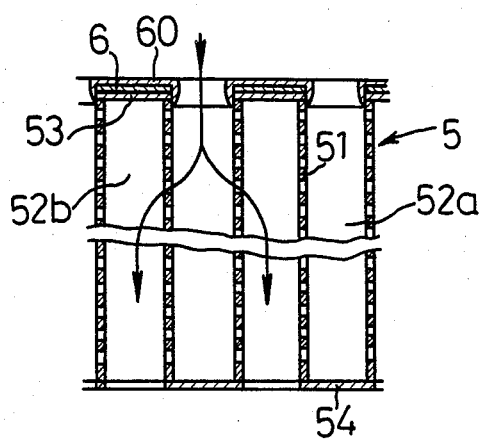
FIG. 5 is a partially cut away longitudinal sectional view of one portion of the filter member employed in a third embodiment of the exhaust gas cleaning device according to the present invention.

FIG. 5 illustrates a filter member employed in a third embodiment of the exhaust gas cleaning device according to the present invention.

In this embodiment, the entire surface of the heater 6 which is formed on the upstream end surface of the filter member 5 is covered with a glass layer 60. Therefore, the heater 6 is protected from corrosion due to exhaust gases.

As a result of the inventors' experiment, it has been confirmed that life of the heater 6 can be extended by about 4 times by covering the heater 6 with the glass layer 60.

The glass layer 60 is preferably made of heat resistant glass having a coefficient of thermal expansion near that of the filter member 5.

Hereinafter, examples of the pattern of the film-shaped electric heater 6 and those of the structure of the electrodes, will be explained.

Figure 6:
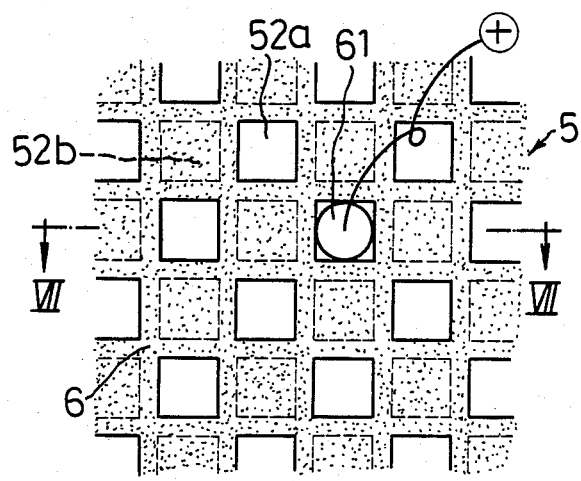
FIG. 6 is a view illustrating one example of the pattern of the heater according to the present invention.
Figure 7:
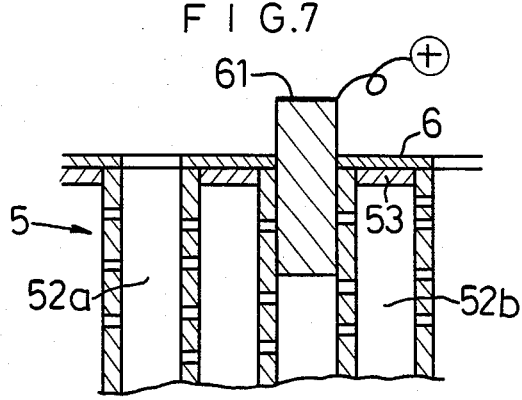
FIG. 7 is a partially cut away longitudinal sectional view taken along the line VII—VII of FIG. 6.
Figure 8:
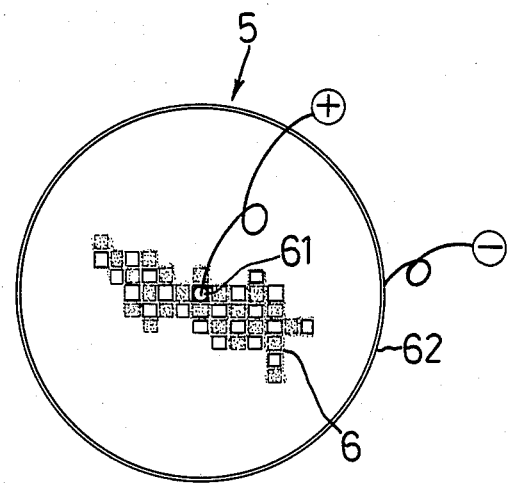
FIG. 8 is a view illustrating a negative electrode of the heater illustrated in FIG. 6.

In the filter member shown in FIGS. 6 to 8, on the entire upstream end surface of the filter member 5, the heater 6 is formed. A rod-shaped positive electrode terminal 61 is closely inserted into an upstream end opening of one gas inlet passage 52a positioned at an axial center of the filter member 5 so as not to be dropped thereout. The terminal 61 is electrically connected to the heater 6.

On the outer peripheral surface of the upstream end portion of the filter member 5, a film 62 serving as a negative electrode, is formed. The film 62 is made of metal having an electric resistivity lower than that of the heater 6 and is electrically connected to the edge of the heater 6.

As shown in FIG. 1, the positive electrode terminal 61 is electrically connected to the battery 8 while the film 62 is grounded by way of the casing 4.

Figure 9:
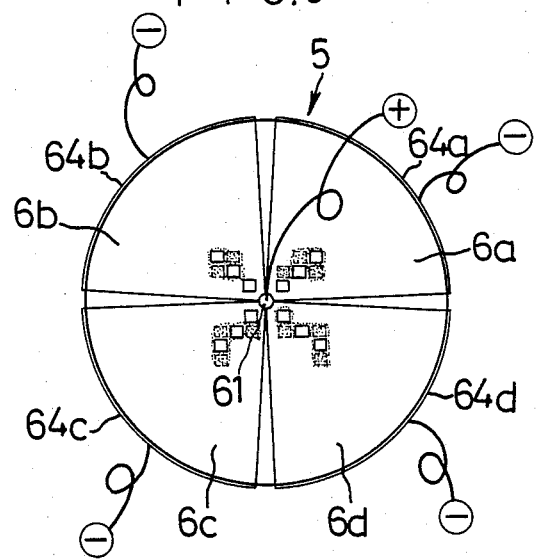
FIG. 9 is a view illustrating another example of the pattern of the heater according to the present invention.

In another example of the heater pattern shown in FIG. 9, four pieces of heaters 6a, 6b, 6c, 6d are formed on the upstream end surface of the filter member 5 at predetermined distances.

One end of each of the heaters 6a to 6d is electrically connected to the positive electrode terminal 61 positioned at the center of the filter member.

On the outer peripheral surface of the upstream end portion of the filter member 5, four pieces of film 64a, 64b, 64c, 64d serving as the negative electrodes, are formed and electrically connected to the heaters 6a to 6d, respectively.

Electric current is supplied to the heaters 6a to 6d in order or alternately.

As described above, according to the present invention, at least one piece of heater made of a heating resistor is integrally formed on the filter member.

Therefore, the heater is prevented from dropping out of the filter member or short-circuiting with each other due to vibrations of an automobile.

Furthermore, the heaters can be easily mounted on the filter member.

Additionally, the heaters are formed on the entire upstream end surface of the filter member. Therefore, at first the carbon particulates collected near the openings of the exhaust gas inlet passages of the filter member are burnt off, then the combustion of carbon particulates spreads to the downstream side of the filter member so that all of the collected particulates are surely eliminated and the filter member is completely regenerated.

What is claimed is:

1. An exhaust gas cleaning device for collecting carbon particulates in exhaust gases discharged from an engine and burning off the collected carbon particulates, comprising:

a casing having an inlet port and a discharge port for introducing and discharging said exhaust gases;

a honeycomb structured filter member for collecting carbon particulates in said exhaust gases, which is disposed within said casing between said inlet port and said discharge port; said filter member being made of heat resistant ceramic and being provided with a large number of intersecting porous walls which define a large number of inlet gas passages and a large number of outlet gas passages so as to be adjacent to each other; the upstream end of each of said inlet gas passages being open while the downstream end thereof is closed by a downstream end wall and the upstream end of each of said outlet gas passages being closed by an upstream end wall while the downstream end thereof is open;

an electric heater for heating the carbon particulates collected by said filter member; said electric heater being composed of at least one film-shaped heating resistor which is directly formed on said upstream end wall of said filter member so as to be integral therewith; and an electric current supplying means for supplying electric current to said electric heater; said electric current supplying means comprising a positive electrode and a negative electrode, which are electrically connected to said electric heater, respectively.

2. An exhaust gas cleaning device according to claim 1, wherein:

said at least one heating resistor is made of a paste composed of a mixture of such a material as to generate heat by feeding electric current thereto, with an organic binder.

3. An exhaust gas cleaning device according to claim 2, wherein:

said at least one film-shaped heating resistor is integrally formed on the upstream end portion of said porous walls defining said inlet gas passages in addition to said upstream end wall of said filter member.

4. An exhaust gas cleaning device according to claim 2, further comprising:

at least one glass layer which covers said at least one heating resistor.

5. An exhaust gas cleaning device according to claim 1, wherein:

said positive electrode has a rod-shape and is inserted into said opened upstream end of one of said inlet gas passages of said filter member; and said negative electrode has a film-shape and is formed on the upstream end portion of the outer peripheral surface of said filter member.

6. An exhaust gas cleaning device according to claim 5, wherein:

said at least one film-shaped heating resistor comprises one film-shaped heating resistor which is formed on all of said upstream end walls of said filter member;

said negative electrode is formed on the upstream end portion of the entire outer peripheral surface of said filter member and is electrically connected to the outer edge of said heating resistor.

7. An exhaust gas cleaning device according to claim 5, wherein:

said at least one film-shaped heating resistor comprises a plurality of film-shaped heating resistors having a sector shape, which are arranged about an axis of said filter member so as to be separated from one another by predetermined distances;

said positive electrode is inserted into said inlet gas passage extending along said axis of said filter member so as to be electrically connected to an inner end of each of said heating resistors;

said negative electrode is composed of a plurality of film-shaped electrodes which are formed on the outer peripheral surface of said filter member so as to be separated from one another by said predetermined distances and electrically connected to the outer edges of said heating resistors, respectively.

8. An exhaust gas cleaning device according to claim 1, wherein:

said at least one film-shaped heating resistor is made of a material selected from the group consisting of platinum, molybdenum-manganese alloy, tungsten, gold, silver-paradium alloy, titanium nitride, silicon carbide, and molybdenum silicide.

* * * * *